(12) United States Patent
Prechner et al.

(10) Patent No.: US 9,456,305 B2
(45) Date of Patent: Sep. 27, 2016

(54) APPARATUS, SYSTEM AND METHOD OF SELECTING LOCATION PROVIDERS

(71) Applicant: INTEL IP CORPORATION, Santa Clara, CA (US)

(72) Inventors: Gaby Prechner, Rishon Lezion (IL); Elad Eyal, Shoham (IL); Itai Steiner, Tel Aviv (IL); Livnat Ehrenberg, Giv'at Shmuel (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/329,956

(22) Filed: Jul. 13, 2014

(65) Prior Publication Data

US 2016/0014563 A1    Jan. 14, 2016

(51) Int. Cl.
*H04W 24/00* (2009.01)
*H04W 4/02* (2009.01)
*H04W 52/02* (2009.01)

(52) U.S. Cl.
CPC .......... *H04W 4/023* (2013.01); *H04W 52/0212* (2013.01)

(58) Field of Classification Search
CPC .................. H04W 4/023; H04W 52/0212
USPC ........................................ 455/456.2
See application file for complete search history.

(56) References Cited

U.S. PATENT DOCUMENTS

| | | | |
|---|---|---|---|
| 8,532,670 B2* | 9/2013 | Kim | G01S 19/16 455/26.1 |
| 8,810,454 B2* | 8/2014 | Cosman | H04W 64/00 342/451 |

* cited by examiner

*Primary Examiner* — Amancio Gonzalez
(74) *Attorney, Agent, or Firm* — Shichrur & Co.

(57) ABSTRACT

Some demonstrative embodiments include apparatuses, systems and/or methods of selecting location providers. For example, a location provider (LP) selector to operate in a mobile device may include a memory to store an Accuracy-Power Decision Matrix (APDM), the APDM to provide an allocation of a plurality of LPs according to a plurality of power consumption levels and a plurality of accuracy ranges; and a controller to receive from a location client of the mobile device a location request for a location fix of the mobile device, and to assign to the location request one or more LPs of the plurality of LPs, based on the APDM, an accuracy requirement of the location request, and a power consumption requirement of the location request.

24 Claims, 6 Drawing Sheets

| Accuracy\Power | Low | | | Moderate | | | Unconstrained or no hint | | |
|---|---|---|---|---|---|---|---|---|---|
| >100m | LP1 | LP2 | LP3 | LP1 | LP2 | LP3 | LP1 | LP2 | |
| 20-100m | LP2 | LP1 | LP3 | LP2 | LP1 | LP3 | LP2 | LP3 | LP1 |
| <20m | LP2 | LP1 | LP3 | LP4 | LP2 | LP1 | LP4 | LP3 | LP2 |
| Floor ID | LP2 | LP4 | | LP2 | LP4 | | LP4 | LP2 | |

Fig. 2

APPARATUS, SYSTEM AND METHOD OF SELECTING LOCATION PROVIDERS

TECHNICAL FIELD

Embodiments described herein generally relate to selecting location providers.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites.

One solution for indoor navigation includes a Time-of-Flight (ToF) measurement method. The ToF may be defined as the overall time a signal propagates from a first station, e.g., a user ("client") mobile device, to a second station, e.g., an access point (AP), and back to the first station. A distance between the first and second stations may be calculated based on the ToF value, for example, by dividing the ToF value by two and multiplying the result by the speed of light.

In one example, the mobile device may be in the indoor location, in which the mobile device is unable to receive signals from the GNSS satellites. The mobile device may use the ToF measurement in the indoor location. However, when the mobile device moves out of the indoor location, the ToF measurement may become not accurate, and using the signals from the GNSS may be more beneficial. In some cases, the mobile device may continue to use the ToF measurement, until the ToF measurement is not available, for example, even if the ToF measurement is not accurate.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic illustration of an Accuracy Power Detection Matrix (APDM), in accordance with some demonstrative embodiments.

DETAILED DESCRIPTION

Figure 1:
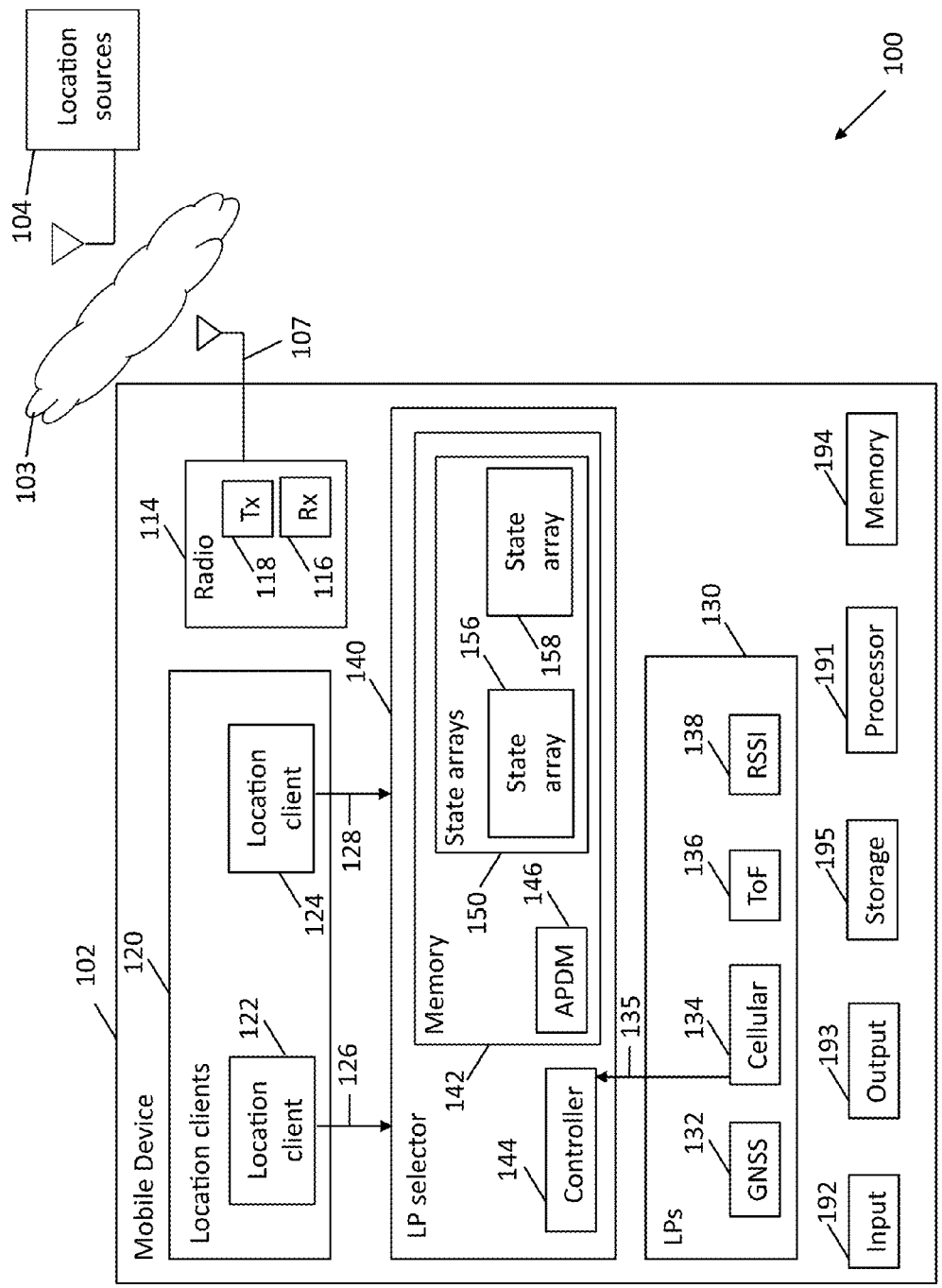
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications, Mar.* 29, 2012; *IEEE*802.11 task group ac (*TGac*) ("*IEEE*802.11-09/0308r12—*TGac Channel Model Addendum Document*"); IEEE 802.11 task group ad (*TGad*) (*IEEE P*802.11*ad*-2012, *IEEE Standard for Information Technology—Telecommunications and Information Exchange Between Systems—Local and Metropolitan Area Networks—Specific Requirements—Part* 11:

Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "access point" (AP), as used herein, may include an entity that contains one station (STA) and provides access to distribution services, via the WM for associated STAs.

As shown in FIG. 1, in some demonstrative embodiments, system 100 may include one or more mobile devices, e.g., a mobile device 102.

In some demonstrative embodiments, mobile device 102 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, mobile device 102 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, computing device 102 may include at least one radio 114 to perform wireless communication between computing device 102 and one or more other wireless communication devices.

In some demonstrative embodiments, radio 114 may include one or more wireless receivers (Rx) 116, able to receive wireless communication signals, RF signals, frames, blocks, transmission streams, packets, messages, data items, and/or data.

In some demonstrative embodiments, radio 114 may include one or more wireless transmitters (Tx) 118, able to send wireless communication signals, RF signals, frames, blocks, transmission streams, packets, messages, data items, and/or data.

In some demonstrative embodiments, radio 114 may include modulation elements, demodulation elements, amplifiers, analog to digital and digital to analog converters, filters, and/or the like. For example, radio 114 may include or may be implemented as part of a wireless Network Interface Card (NIC), and the like.

In some demonstrative embodiments, radio 114 may include, or may be associated with, one or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, mobile device 102 may also include, for example, a processor 191, an input unit 192, an output unit 193, a memory unit 194, and/or a storage unit 195. Mobile device 102 may optionally include other suitable hardware components and/or software components. In some demonstrative embodiments, some or all of the components of mobile device 102 may be enclosed in a common housing or packaging, and may be interconnected or operably associated using one or more wired or wireless links. In other embodiments, components of mobile device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 102 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 102.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, Cathode Ray Tube (CRT) display unit, one or more audio speakers or earphones, or other suitable output devices.

In some demonstrative embodiments, device 102 may be capable of receiving location information from location sources 104 via wireless medium 103.

In some demonstrative embodiments, location sources 104 may include, for example, global navigation satellite system (GNSS) satellites, access points, radio frequency (RF) transmitters, cellular base stations, Bluetooth (BT) devices, and/or the like.

In some demonstrative embodiments, device 102 may be configured to determine a location fix of device 102, for example, based on the location information from location sources 104.

In some demonstrative embodiments, device 102 may include a plurality of location providers (LPs) 130 configured to determine the location fix of device 102, for example, based on the location information from location sources 104.

In some demonstrative embodiments, the plurality of LPs 130 may include a global navigation satellite system (GNSS) location provider (LP) 132.

In one example, GNSS LP 132 may be configured to determine the location fix of device 102, for example, based on location information from the GNSS satellites.

In some demonstrative embodiments, the plurality of LPs 130 may include a cellular LP 134.

In one example, cellular LP 134 may be configured to determine the location fix of device 102, for example, based on location information from the cellular base stations.

In some demonstrative embodiments, the plurality of LPs 130 may include a Time of Flight (ToF) LP 136.

In one example, ToF LP 136 may be configured to determine the location fix of device 102, for example, based on location information from the Access points.

In some demonstrative embodiments, the plurality of LPs 130 may include a receive signal strength indication (RSSI) LP 138.

In one example, RSSI LP 138 may be configured to determine the location fix of device 102, for example, based on location information from the RF transmitters and/or BT devices and the like.

In some demonstrative embodiments, the plurality of LPs 130 may include any other location provider.

In some demonstrative embodiments, the plurality of LPs 130 may determine the location fix of device 102, for example, using one or more calculations, algorithms, measurements, a trilateration, and/or any other method, based on the location information from location sources 104.

In some demonstrative embodiments, each LP of the plurality of LPs 130 may consume different power consumption to determine the location fix of device 102.

In some demonstrative embodiments, a first LP of the plurality of LPs 130 may consume a first power consumption to determine the location fix of device 102, and a second LP of the plurality of LPs 130 may consume a second power consumption, e.g., greater than the first power consumption, to determine the location fix of device 102.

For example, a first power consumption of cellular LP 134 may be lesser than a second power consumption of GNSS LP 132.

In some demonstrative embodiments, each LP of the plurality of LPs 130 may provide a location fix with different accuracy.

In some demonstrative embodiments, a first accuracy of a first location fix provided by a first LP of the plurality of LPs 130 may be different from, e.g., greater than, a second accuracy of a second location fix provided by a second LP of the plurality of LPs 130. For example, a first accuracy of a first location fix from ToF LP 136 may be greater than a second accuracy of a second location fix from cellular LP 134.

In some demonstrative embodiments, device 102 may include a plurality of location clients 120.

In some demonstrative embodiments, the plurality of location clients 120 may be configured to utilize the location fix of device 102. For example, the plurality of location clients 120 may include location-based applications and/or services, e.g., geofencing applications, navigation applications, commercial applications, social applications, and/or the like.

In some demonstrative embodiments, the plurality of location clients 120 may include a first location client 122 and/or a second location client 124.

In one example, location client 122 may include an indoor navigation application, and/or location client 124 may include an outdoor navigation application, e.g., terrain navigation application.

In another example, location client 122 and/or location client 124 may include any other combination of location-based applications.

In some demonstrative embodiments, one or more location clients of the plurality of location clients 120 may send one or more requests for the location fix of mobile device 102, for example, to estimate the location of device 102. For example, location client 122 and/or location client 124 may request the location fix of mobile device 102, for example, to estimate the location of device 102.

In some demonstrative embodiments, the one or more requests from the one or more location clients may have different requirements with respect to the location fix.

For example, a first request may require to receive the location fix periodically at a first accuracy level, while a second request may require to receive a one-time location fix at a second, e.g., different, accuracy level.

In some demonstrative embodiments, device 102 may include an LP selector 140 configured to select one or more LPs of the plurality of LPs 130 to provide the location fix of device 102 to the one or more location clients.

In some demonstrative embodiments, LP selector 140 may increase power consumption of device 102 and/or may drain a battery of device 102, for example, if LP selector 140 selects all LPs of the plurality of LPs 130, for each request of the one or more requests for the location fix of device 102.

In some demonstrative embodiments, LP selector 140 may be configured to assign one or more LPs of the plurality of LPs 130 for each request from a location client, and to select for each request an active LP, e.g., one active LP per request, from the assigned one or more LPs, e.g., to provide the location fix to the location client, e.g., as described below.

In some demonstrative embodiments, the active LP may include an LP, which is capable of satisfying the one or more requirements of the location request, and providing the location fix to the location client; or an LP, which is capable of providing a best result from the one or more LPs assigned to the request, for example, if none of the LPs assigned to the location request is capable of satisfying the requirements of the location request, e.g., as described below.

In some demonstrative embodiments, a location client of the plurality of location clients 120 may receive a location fix with a reduced accuracy, for example, if LP selector persistently selects the same LP ("the persistent LP") from the plurality of LPs 130.

In one example, the location client may receive a location fix having a reduced accuracy, for example, if LP selector 140 selects a non-suitable LP. For example, location client 122 may receive the location fix with the reduced accuracy, for example, if LP selector 140 selects GNSS LP 132, and mobile device 102 is within an indoor location.

In some demonstrative embodiments, LP selector 140 may be configured to select the most suitable LP, e.g., the active LP, for each request from the plurality of location clients 120.

In some demonstrative embodiments, LP selector 140 may be configured to select the most suitable location provider, while maintaining a reduced power consumption of device 102, e.g., as described below.

In some demonstrative embodiments, a location client of the plurality of location clients 120 may receive a location fix with a reduced accuracy, for example, if LP selector selects the persistent LP and maintains the persistent LP, e.g., as long as the persistent LP is available.

In one example, location client 122 may receive the location fix with the reduced accuracy, for example, if LP selector 140 maintains the same LP, e.g., even if the LP is not suitable. For example, location client 122 may receive the location fix with the reduced accuracy, if LP selector 140 selects ToF LP 136, when device 102 is within the indoor location, and maintains ToF LP 136, when device 102 moves out of the indoor location to an outdoor location, in which ToF LP 136 may not be accurate and/or GNSS LP 132 may be more accurate than ToF LP 136.

In some demonstrative embodiments, LP selector 140 may be configured to dynamically switch the active LP, for example, if the active LP is not suitable to provide the location fix with the required accuracy, and/or if another LP is more suitable to provide the location fix with the required accuracy, e.g., as described below.

In some demonstrative embodiments, the selection of the LPs may not be efficient, for example, if LP selector 140 separately handles two or more location fix requests from two or more clients of the plurality of location clients 120.

In one example, the selection of the LPs may not be efficient, for example, if LP selector 140 separately handles a first location fix request from location client 122, and a second location fix request from location client 124. For example, the selection of the LPs may be more efficient, for example, if LP selector 140 considers the first request when LP selector 140 handles the second request, e.g., as described below.

For example, LP selector 140 may use the active LP of the first request for the second request, for example, if the active LP of the second request is suitable for the second request, e.g., as described below.

In some demonstrative embodiments, LP selector 140 may be configured to handle a plurality of requests, each request having different requirements, e.g., as described below.

In some demonstrative embodiments, LP selector 140 may be configured to provide the location fix to the location client at a relatively short time, e.g., as described below.

In some demonstrative embodiments, LP selector 140 may assign one or more LPs to provide the location fix for a location request based on an Accuracy-Power Decision Matrix (APDM) 146, e.g., as described below.

In some demonstrative embodiments, LP selector 140 may include a memory 142 to store APDM 146. In other embodiments APDM 146 may be stored in memory 194.

In some demonstrative embodiments, APDM 146 may provide an allocation of the plurality of LPs 130 according to a plurality of power consumption levels and a plurality of accuracy ranges.

In some demonstrative embodiments, APDM 146 may associate between the plurality of LPs 130, the plurality of power consumption levels, and the plurality of accuracy ranges.

In some demonstrative embodiments, APDM 146 may include a plurality of power-accuracy combinations. For example, each power-accuracy combination may be a combination of a power consumption level and an accuracy range.

In some demonstrative embodiments, APDM 146 may define for each power-accuracy combination a plurality of potential LPs of the plurality of LPs 130, e.g., as described below with reference to FIG. 2.

Reference is made to FIG. 2, which schematically illustrates an APDM 200, in accordance with some demonstrative embodiments. For example, APDM 200 may perform the functionality of APDM 146 (FIG. 1).

As shown in FIG. 2, APDM 200 may define a plurality of power consumption levels 220 versus a plurality of accuracy ranges 240.

As shown in FIG. 2, the plurality of power consumption levels 220 may include, for example, a first level 222, e.g., a "low power consumption level"; a second level 224, e.g., a "moderate power consumption level"; and/or a third level 226, e.g., an "unconstrained or unknown power consumption level".

In other embodiments, the plurality of power consumption levels 220 may include any other number and/or type of levels, e.g., five power consumptions levels.

As shown in FIG. 2, the plurality of accuracy ranges 240 may include, for example, a first accuracy range 242, e.g., an accuracy greater than 100 meters (m); a second accuracy range 244, e.g., an accuracy between 20 m and 100 m; a third accuracy range 246, e.g., an accuracy lesser than 20 meters; and/or a fourth accuracy range 248, e.g., an accuracy for indoor navigation, for example, an accuracy of few meters.

In other embodiments, the plurality of accuracy ranges 240 may include any other number and/or type of ranges, e.g., five accuracy range levels.

As shown in FIG. 2, APDM 200 may include a plurality of power-accuracy combinations, each power-accuracy combination may be a combination of a power consumption level of power consumption levels 222, 224, or 226, and an accuracy range of accuracy ranges 242, 244, 246 or 248.

As shown in FIG. 2, each power-accuracy combination may include a plurality of potential LPs of a first LP, denoted LP1, a second LP, denoted LP2, a third LP, denoted LP3, and/or a fourth LP, denoted LP4.

For example, a power-accuracy combination 232 may include a combination of low power consumption 222 and third accurate range 246. For example, power-accuracy combination 232 may include the LPs LP2, LP1, and LP3.

In some demonstrative embodiments, one LP of LP1, LP2, LP3 and/or LP4 may include RSSI LP 138 (FIG. 1); another LP of LP1, LP2, LP3 and/or LP4 may include cellular LP 134 (FIG. 1); another LP of LP1, LP2, LP3 and/or LP4 may include GNSS LP 132 (FIG. 1); and/or another LP of LP1, LP2, LP3 and/or LP4 may include cellular ToF 136 (FIG. 1). In other embodiments, the LPs LP1, LP2, LP3 and/or LP4 may include any other additional or alternative LPs.

In some demonstrative embodiments, the plurality of potential LPs may be prioritized, for example, based on the accuracy of a location fix provided by a potential LP. For example, the leftmost LP of power-accuracy combination 232, e.g., LP2, may have the highest priority, and the rightmost LP of power-accuracy combination 232, e.g., LP3, may have the lowest priority.

Referring back to FIG. 1, in some demonstrative embodiments, LP selector 140 may include a controller 144 to control selection of the one or more LPs.

In some demonstrative embodiments, one or more elements of LP selector, e.g., controller 144 may include or may be implemented by one or more processors and/or circuitry configured to perform the functionality of controller 144 and/or LP selector 140, e.g., as described below.

In some demonstrative embodiments, controller 144 may receive from location client 122 a location request 126 for a location fix of mobile device 102.

In some demonstrative embodiments, controller 144 may assign to location request 126 one or more LPs of the plurality of LPs 130.

In some demonstrative embodiments, controller 144 may assign the one or more LPs to location request 126, based on APDM 146, and one or more requirements of location request 126.

In some demonstrative embodiments, the one or more requirements of location request 126 may include an accuracy requirement of location request 126, and/or a power consumption requirement, e.g., as described below.

In some demonstrative embodiments, the one or more requirements of location request 126 may include an indication if location request 126 is a one-time request or a periodic request, and/or a rate to provide the location fix to location client 122, e.g., every 10 seconds (sec), for example, if location request 126 is a periodic request.

In some demonstrative embodiments, controller 144 may determine a required power-accuracy combination of the plurality of power-accuracy combinations, based on the accuracy requirement and the power-consumption requirement of location request 126.

In one example, controller 144 may determine the required power-accuracy combination to be a power-accuracy combination 234 (FIG. 2) of power consumption level 224 (FIG. 2) and accuracy range 246 (FIG. 2), for example, if the accuracy requirement of location request 126 includes an accuracy lesser than 20 m, and the power consumption requirement of location request 126 includes a moderate power consumption.

In some demonstrative embodiments, controller 144 may assign to location request 126 one or more potential LPs defined by the APDM 146 for the required power-accuracy combination. For example, controller 144 may assign one or more LPs of combination 234, e.g., one or more LPs of LP1, LP2, LP3 and LP4.

In some demonstrative embodiments, controller 144 may assign to location request 126 all potential LPs defined by APDM 146 for the required power-accuracy combination.

For example, controller 144 may assign to location request 126 all potential LPs of power-accuracy combination 234 (FIG. 2), e.g., LP1, LP2, LP3 and LP4.

In some demonstrative embodiments, controller 144 may assign to location request 126 all potential LPs defined by APDM 146, for example, if location request 126 is a one-time location request, e.g., as described below with reference to FIG. 3.

In one example, controller 144 may assign to location request 126 all potential LPs, if location request 126 includes a one time location request, for example, to be able to provide the location fix to location client 122 within a relatively short time.

In some demonstrative embodiments, controller 144 may assign to location request 126 all potential LPs defined by APDM 146, for example, if location request 126 is a periodic request, and no LP of the potential LPs is currently an active LP for location request 126 or for another location request, e.g., from location client 124, and capable of providing the location fix according to the one or more requirements of location request 126, e.g., as described below with reference to FIG. 3.

In some demonstrative embodiments, controller 144 may assign to location request 126 a selected LP of the plurality of potential LPs defined by APDM 146 for the required power-accuracy combination.

In one example, controller 144 may assign the selected LP to location request 126, for example, if an LP of the one or more LP is available, and capable of providing the location fix according to the one or more requirements of location request 126.

In one example, controller 144 may assign LP4 to location request 126, for example, if LP4 is available and capable of providing the location fix according to the one or more requirements of location request 126, and power-accuracy combination 234 (FIG. 2) is the required power-accuracy combination.

In some demonstrative embodiments, the selected LP may be suitable for providing the location fix according to the one or more requirements of location request 126, for example, if the selected LP satisfies the accuracy requirement of location request 126, and the power consumption requirement of request 128; and the selected LP provides the location fix at the rate required by location request 126, e.g., a rate equal to or smaller than a rate required by location request 126.

In some demonstrative embodiments, controller 144 may receive one or more reports from the one or more LPs assigned to location request 126.

In one example, controller 144 may receive one or more reports from all the plurality of potential LPs defined by APDM 146 for the required power accuracy combination for location request 126, for example, if controller 144 assigns all the potential LPs defined by APDM 146 for location request 126.

In another example, controller 144 may receive a report from a selected LP of the plurality of potential LPs, for example, if controller 144 assigns the selected LP for location request 126.

In some demonstrative embodiments, controller 144 may receive a report from an LP of the one or more LPs assigned to location request 126. For example, controller 144 may receive a report 135 from cellular LP 134.

In some demonstrative embodiments, controller 144 may determine if the report is suitable to provide the location fix to location client 125 ("meeting request"), for example, if an accuracy of a location fix in the report is equal to or greater than the accuracy requirement of location request 126, or if the power consumption of the LP providing the report is a low power consumption or a moderate power consumption. Controller 144 may determine that the report is to suitable to provide the location fix to location client 125, e.g., even if the accuracy of the location fix in the report is lesser than the accuracy requirement of location request 126, for example, if none of the LPs assigned to location request 126 is capable of satisfying the requirements of the location request 126, and the LP providing the report has the highest priority according to APDM 146. In some demonstrative embodiments, controller 144 may update a state array 156 corresponding to location request 126 from location client 122, e.g., based on report 135.

In some demonstrative embodiments, memory 142 may store a plurality of state arrays 150 corresponding to the plurality of location requests from the plurality of location clients 120.

In other embodiments, memory 194 may store the plurality of state arrays 150.

In some demonstrative embodiments, the plurality of state arrays 150 may include state array 156, and a state array 158 corresponding to another location request 128.

In some demonstrative embodiments, state array 156 may include a plurality of states corresponding to the plurality of LPs 130, respectively. For example, state array 156 may include a first state corresponding to GNSS LP 132, a second state corresponding to Cellular LP 134, a third state corresponding to ToF LP 136, and a fourth state corresponding to RSSI LP 138.

In some demonstrative embodiments, each state of the plurality of states may include a state selected from a predefined set of states. For example, the predefined set of states may include an assigned state, an unavailable state, an active state, an invalid state, and/or an unassigned state.

In some demonstrative embodiments, an assigned state with respect to an LP may include a state, in which the LP is assigned to a location request and has not provided a report yet. For example, cellular LP 134 may be at the assign state for location request 126, for example, if controller 144 assigns cellular LP 134 to location request 126, and cellular LP 134 has not yet provided a location report.

In some demonstrative embodiments, the unavailable state with respect to an LP may include a state, in which the LP is unavailable, e.g., due to a permanently or a temporary hardware (HW) failure, and/or unavailability of a HW of the LP. For example, cellular LP 134 may be at the unavailable state, for example, if one or more HW elements of cellular LP 134 may be in a malfunctioned state.

In some demonstrative embodiments, the active state with respect to an LP may include a state, in which the LP is the active LP for the location request, for example, the LP is assigned to the location request, e.g., a periodic location request, and already provided a valid location fix.

In some demonstrative embodiments, controller 144 may determine a single LP to be in the active state for the location request. For example, controller 144 may determine ToF LP 136 to be in the active state for location request 126.

In some demonstrative embodiments, the un-assigned state with respect to an LP may include a state, in which the LP is unassigned to a location request, e.g., the LP is not required to provide a location fix for the location request. For example, cellular LP 134 may be at the unassigned state, for example, if controller 144 un-assigns cellular LP 134 from location request 126.

In some demonstrative embodiments, the invalid state with respect to an LP may include a state, in which the LP is assigned to a location request, e.g., a periodic location request, and provided a report without a location fix.

In some demonstrative embodiments, at the invalid state the LP may continue to try to provide the location fix, for example, until the LP is unassigned, e.g., if the location request is periodic and a report from another LP meets the request.

In some demonstrative embodiments, controller 144 may update a state of the LP in state array 156, based on the report. For example, controller 144 may update a state of cellular LP 134 based on report 135.

In one example, controller 144 may update the state of cellular LP 134 in state array 156 to the unavailable state, for example, if cellular LP 134 sends an indication of a HW failure of cellular LP 134.

In another example, controller 144 may update the state of cellular LP 134 in state array 156 to the assign state, for example, if controller 144 assigns cellular LP 134 to location request 126.

In another example, controller 144 may update the state of cellular LP 134 in state array 156 to the invalid state, for example, if controller 144 assigns cellular LP 134 for location request 126, and report 135 does not include a location fix of device 102, e.g., if cellular LP 134 does not receive information from a cellular base station.

In another example, controller 144 may update the state of cellular LP 134 in state array 156 to the active state, for example, if report 135 includes a location fix of device 102, and the location fix reported by cellular LP 134 has the most accurate location fix, e.g., compared to one or more other location fix values received from one or more other LPs of the one or more LPs assigned to location request 126.

In some demonstrative embodiments, controller 144 may update a state of an other LP in state array 156, based on the report. For example, controller 144 may update a state of GNSS LP 132 based on report 135.

In one example, controller 144 may update the state of GNSS LP 132 in state array 156 to the unassigned state, based on report 135, for example, if controller 144 selects cellular LP 134 to be the active LP, e.g., as described below.

In another example, controller 144 may update the state of GNSS LP 132 in state array 156 to the assigned state, for example, if report 135 indicates that cellular LP 134 is invalid, and cellular LP 134 is currently the active LP for location request 126, e.g., as described below.

In some demonstrative embodiments, controller 144 may update a state of the LP in another state array corresponding to another location request, based on the report.

In one example, controller 144 may update the state of cellular LP 134 in state array 158 to the invalid state, for example, if report 135 indicates no fix.

In another example, controller 144 may update the state of cellular LP 134 in state array 158 to the invalid state, for example, if report 135 does not include a location fix of device 102.

In some demonstrative embodiments, controller 144 may send a response to location client 122 based on state array 156.

In some demonstrative embodiments, the response may include the location fix of device 102 provided by the active LP of state array 156.

In some demonstrative embodiments, controller 144 may dynamically select the active LP to provide the location fix to location client 125, e.g., based on state array 156.

In some demonstrative embodiments, controller 144 may dynamically select the active LP, for example, by comparing a first report from the active LP with a second report from another LP of the one or more LPs, e.g., as described below with reference to FIG. 4.

In some demonstrative embodiments, controller 144 may trigger the selection of the active LP, for example, upon receiving a new location request, e.g., from a location client of location clients 120, receiving a report from an LP of the plurality of LPs 130, stopping a location request, and/or periodically, e.g., for a periodic location request.

In some demonstrative embodiments, the response may not include a location fix of device 102, for example, if the plurality of states of state array 156 includes invalid states.

In some demonstrative embodiments, LP selector 140 may be configured to provide the most accurate location fix at a relatively short time, for example, for each location request from the plurality of location clients 120, while maintaining a reduced power consumption of device 102, e.g., as described above.

In some demonstrative embodiments, LP selector 140 may dynamically select the most accurate location fix at any given time, for example, for each location request from the plurality of location clients 120, e.g., as described above.

In some demonstrative embodiments, LP selector 140 may efficiently select an active LP for a location request from the plurality of location clients 120, while taking into consideration other active LPs of other requests from the plurality of location clients 120.

Figure 3:
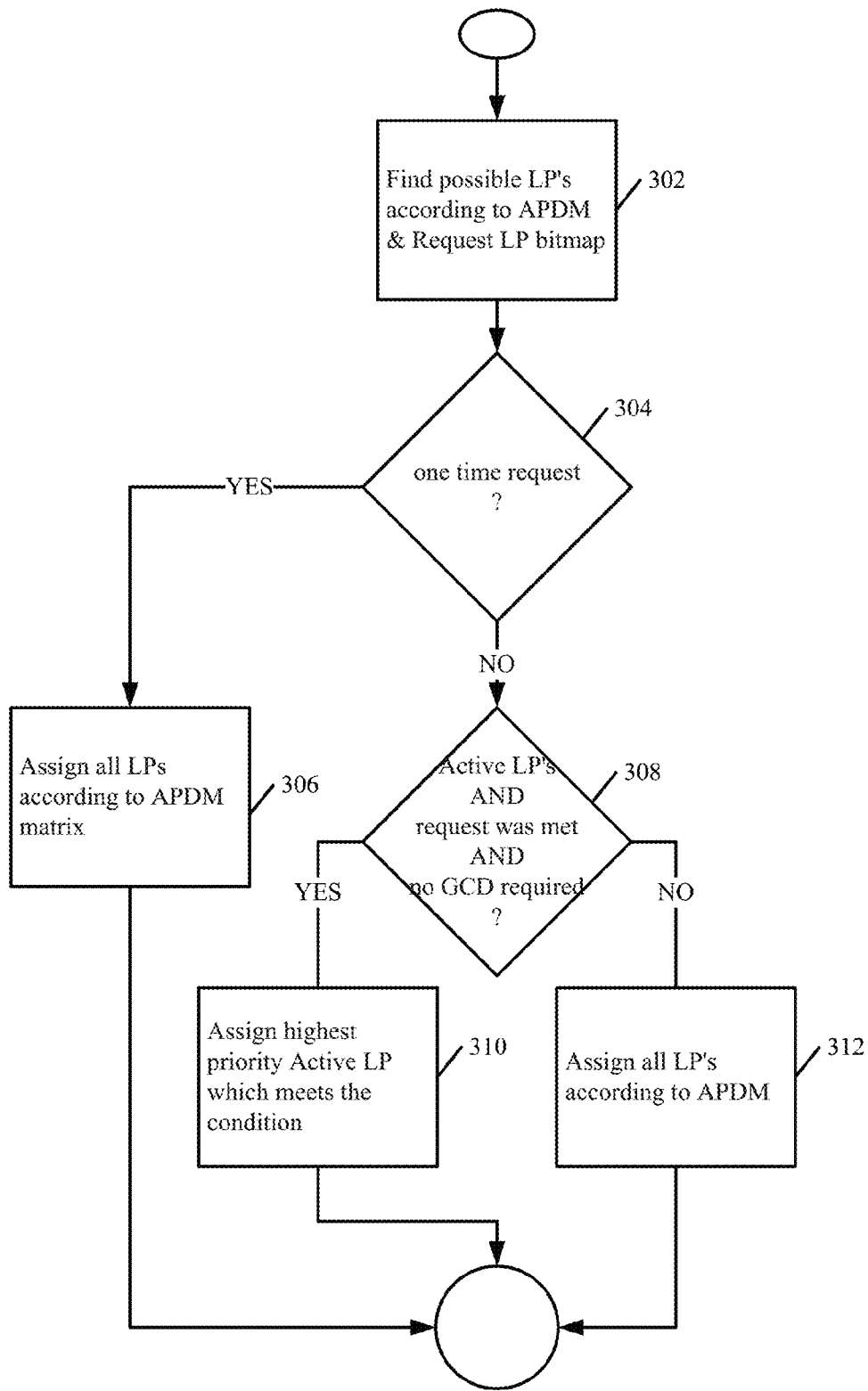
FIG. 3 is a schematic flow chart illustration of a method of assigning one or more location providers, in accordance with some demonstrative embodiments.

Reference is made to FIG. 3, which schematically illustrates a method of assigning one or more LPs to a location request, in accordance with some demonstrative embodiments. For example, one or more of the operations of the method of FIG. 3 may be performed by a wireless communication system, e.g., system 100 (FIG. 1); a mobile device, e.g., device 102, (FIG. 1); an LP selector, e.g., LP selector 140 (FIG. 1); and/or a controller, e.g., controller 144 (FIG. 1).

As indicated at block 302, the method may include determining a required power-accuracy combination of an APDM according to an accuracy requirement and a power consumption requirement of the location request. For example, controller 144 may determine power-accuracy combination 234 (FIG. 2) of APDM 200 (FIG. 2) according to the accuracy requirement and the power consumption requirement of location request 126 (FIG. 1), e.g., as described above.

As indicated at block 304, the method may include determining whether or not the location request is a periodic request or a one-time request. For example, controller 144 (FIG. 1) may determine whether or not location request 126 (FIG. 1) is a periodic request or a one-time request, e.g., as described above.

As indicated at block 306, the method may include assigning all potential LPs defined by the APDM, for example, if the location request is a one-time request. For example, controller 144 (FIG. 1) may assign to location request 126 (FIG. 1) all potential LPs of power-accuracy combination 234 (FIG. 2), for example, if location request 126 include the one-time request, e.g., as described above.

As indicated at block 308, the method may include determining whether or not at least one LP of the potential LPs is currently an active LP, and suitable to provide the location fix of the mobile device according to the one or more requirements of the location request, for example, if the location request is a periodic request. For example, controller 144 (FIG. 1) may determine whether or not the selected LP of the potential LPs is currently at the active state, and suitable to provide the location fix according to the one or more requirements of location request 126 (FIG. 1), for example, if location request 126 (FIG. 1) is a periodic request, e.g., as described above.

As indicated at block 310, the method may include assigning a selected LP of the at least one LP, for example, if the at least one LP is an active LP and suitable to provide the location fix according to the one or more requirements of the location request. For example, the method may include assigning the selected LP having the highest priority in the required power-accuracy combination according to the APDM matrix.

For example, controller 144 (FIG. 1) may assign the selected LP, for example, if the selected LP is an active LP and suitable to provide the location fix of device 102 (FIG. 1) according to the one or more requirements of location request 126 (FIG. 1), e.g., as described above.

In one example, controller 144 may select power-accuracy combination 234 (FIG. 2) for location request 126 (FIG. 1), and both LP4 and LP1 may be active and suitable to provide the location fix of device 102 (FIG. 1) according to the one or more requirements of location request 126 (FIG. 1). According to this example, controller 144 (FIG. 1) may assign LP4, for example, if LP4 has a priority higher than a priority of LP1, e.g., according to power-accuracy combination 234 (FIG. 2).

As indicated at block 312, the method may include assigning all potential LPs defined by the APDM, for example, if no LP of the potential LPs is currently an active LP and suitable to provide the location fix of the mobile device according to the one or more requirements of the location request. For example, controller 144 (FIG. 1) may assign to location request 126 (FIG. 1) all potential LPs defined by APDM 146, for example, if no LP of the potential LPs is currently an active LP and suitable to provide the location fix of mobile device 102 (FIG. 1) according to the one or more requirements of location request 126 (FIG. 1), e.g., as described above.

Figure 4:
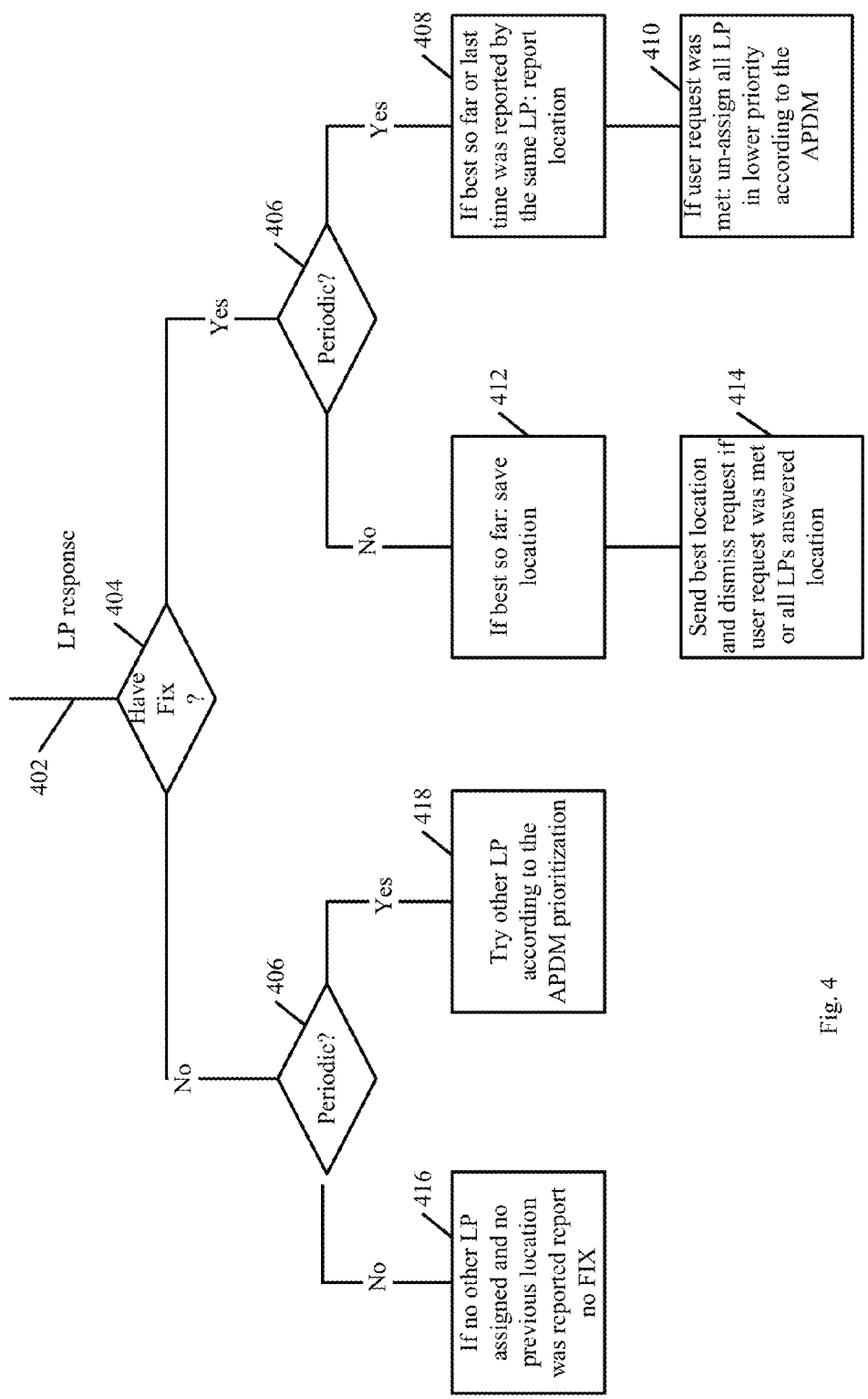
FIG. 4 is a schematic flow chart illustration of a method of processing a report received from a location provider, in accordance with some demonstrative embodiments.

Reference is made to FIG. 4, which schematically illustrates a method of processing a report from a location provider, in accordance with some demonstrative embodiments. For example, one or more of the operations of the method of FIG. 4 may be performed by a wireless communication system, e.g., system 100 (FIG. 1); a mobile device, e.g., device 102 (FIG. 1); an LP selector, e.g., LP selector 140 (FIG. 1); and/or a controller, e.g., controller 144 (FIG. 1).

In some demonstrative embodiments, one or more operations of the method of FIG. 4 may be performed for each location request per a report. For example, the operations of the method of FIG. 4 may be performed for each one of location requests 126 and 128 (FIG. 1), e.g., upon receiving report 135 (FIG. 1).

As indicated by arrow 402, the method may include receiving a report from an LP. For example, controller 144 (FIG. 1) may receive report 135 (FIG. 1) from cellular LP 134 (FIG. 1), e.g., as described above.

As indicated at block 404, the method may include determining whether or not the report includes a location fix. For example, controller 144 (FIG. 1) may determine whether or not report 135 (FIG. 1) includes a location fix of device 102 (FIG. 1), e.g., as described above.

As indicated at blocks 406, the method may include determining whether the location request is a periodic request or a one-time request. For example, controller 144 (FIG. 1) may determine whether location request 126 (FIG. 1) is a periodic request or a one-time request, e.g., as described above.

As indicated at block 408, the method may include reporting the location fix of the report to the location client, for example, if the report includes a location fix and the location request is periodic. For example, the method may include reporting the location fix of the report, for example, if an accuracy of the location fix is most accurate, e.g., compared to accuracies of other location fix values from other reports, or if the LP has previously reported the location fix to the location client In one example, controller 144 (FIG. 1) may report the location fix of report 135 (FIG. 1) to location client 122 (FIG. 1), for example, if report 135 (FIG. 1) includes the location fix, and location request 126 (FIG. 1) is a periodic request; and the accuracy of the location fix of report 135 (FIG. 1) has the highest accuracy, or if cellular LP 134 (FIG. 1) has previously reported a location fix to location client 122 (FIG. 1).

As indicated at block 410, the method may include un-assigning all LPs having a lower priority according to the APDM, for example, if the location request is provided to the location client. For example, controller 144 (FIG. 1) may un-assign GNSS LP 132 (FIG. 1) from location request 126 (FIG. 1), for example, if the location fix of report 135 (FIG. 1) is provided in response to location request 126 (FIG. 1).

As indicated at block 412, the method may include saving the location fix of the report, for example, if the report includes a location fix and the location request is a one-time request. For example, the method may include saving the location fix, for example if the location fix is more accurate, e.g., compared to previous location fix values received for the location request.

In one example, controller 144 (FIG. 1) may save the location fix of report 135 (FIG. 1), for example, if report 135 (FIG. 1) includes the location fix, location request 126 (FIG. 1) is a one-time request, and the location fix is more accurate compared to other location fix values from other reports corresponding to location request 126 (FIG. 1).

As indicated at block 414, the method may include reporting the most accurate location fix to the location client, for example, if the most accurate report satisfies the accuracy requirement and the power requirement of the location request, or if all other LPs assigned to the location request have sent reports. For example, controller 144 (FIG. 1) may report the location fix of report 135 (FIG. 1) to location client 122 (FIG. 1), for example, if the location fix of report 135 (FIG. 1) is the most accurate location fix, e.g., compared to location fix values of other reports form other location providers assigned to request 126 (FIG. 1), or if the location fix satisfies the one or more requirement of location request 126 (FIG. 1).

As indicated at block 416, the method may include reporting no location fix for the location request, for example, if the report does not include a location fix and the location request is a one-time request. For example, the method may include reporting the no location fix for the location request, e.g., if no other LP is assigned to the location request and no location fix was previously reported by any other LP of the one or more LPs.

In one example, controller 144 (FIG. 1) may report a no location fix to location client 122 (FIG. 1), for example, if report 135 (FIG. 1) does not include a location fix, location request 126 (FIG. 1) is a one time request and no other LPs of the one or more LPs assigned to location request 126 (FIG. 1) reported a location Fix.

As indicated at block 418, the method may include waiting to receive other reports from other LPs according to the APDM, for example, if the report from the LP does not include a location fix, and the location request is periodic. For example, controller 144 (FIG. 1) may wait to receive other reports from other LPs according to APDM 146, for example, if report 135 (FIG. 1) does not include a location fix, and the location request is periodic.

In some demonstrative embodiments, the method may include performing one or more operations, for example, if the report does not include a location fix and the location request is periodic.

In one example, the method may include changing the state of the LP to invalid and re-assigning all LPs that are not assigned to the location request, for example, if the LP is the active LP.

In another example, the method may include un-assigning the LP from the current request, for example, if the LP is not the active LP, and the location fix was previously provided by another LP, and the LP is in a final invalid state.

In another example, the method may include changing the state of the LP to invalid, for example, if the LP is not the active LP and the location fix was not previously provided by another LP, e.g., to enable the LP to provide the location fix, for example, if the LP is not invalid anymore.

In some demonstrative embodiments, one or more operations of block 418 may be expressed in a switch case, e.g., as follows:

```
1.1 Switch
    1.1.1 case (current LP = active LP)
        1.1.1.1 Change current LP to invalid
        1.1.1.2 re-assign all LP's that are not assigned
        1.1.1.3 break
    1.1.2 case (current LP in not the active LP &
           Previous location was met)
        1.1.2.1 un-assign current LP if invalid is final
        1.1.2.2 break
    1.1.4 case (current LP in not the active LP &
           Previous location was not met)
        1.1.4.1 Change current LP to invalid
        1.1.4.2 break
```

Figure 5:
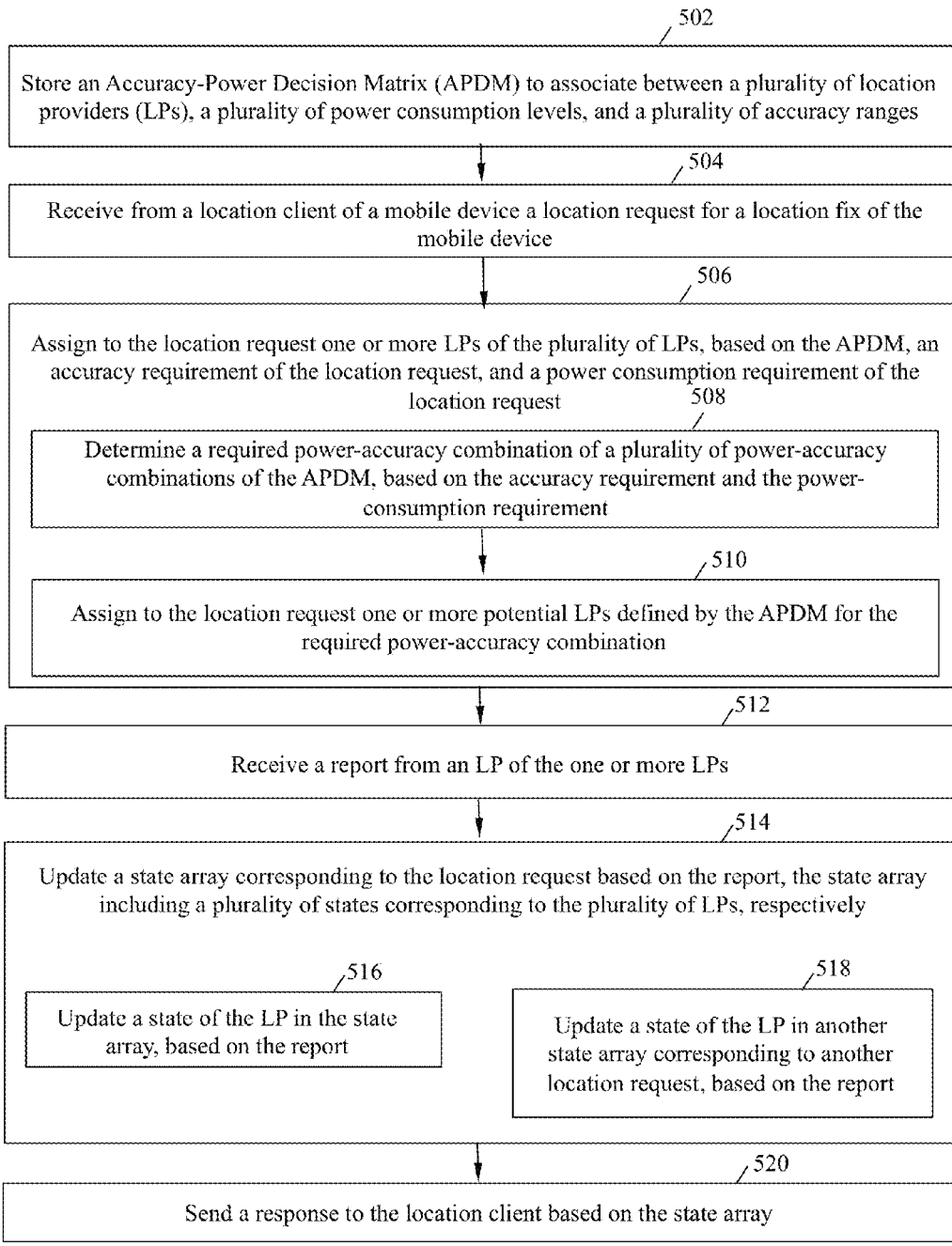
FIG. 5 is a schematic flow chart illustration of a method of selecting location providers, in accordance with some demonstrative embodiments.

Reference is made to FIG. 5, which schematically illustrates a method of selecting location providers, in accordance with some demonstrative embodiments. For example, one or more of the operations of the method of FIG. 5 may be performed by a wireless communication system, e.g., system 100 (FIG. 1); a mobile device, e.g., device 102, (FIG. 1); an LP selector, e.g., LP selector 140 (FIG. 1); and/or a controller, e.g., controller 144 (FIG. 1).

As indicated at block 502, the method may include storing, at a mobile device, an APDM to provide an allocation of a plurality of LPs according to a plurality of power consumption levels and a plurality of accuracy ranges. For example, memory 142 (FIG. 1) may store APDM 146 (FIG. 1), e.g., as described above.

As indicated at block 504, the method may include receiving from a location client of the mobile device a location request for a location fix of the mobile device. For example, controller 144 (FIG. 1) may receive location request 126 (FIG. 1) for location fix of mobile device 102 (FIG. 1), e.g., as described above.

As indicated at block 506, the method may include assigning to the location request one or more LPs of the plurality of LPs, based on the APDM, an accuracy requirement of the location request, and a power consumption requirement of the location request, For example, controller 144 (FIG. 1) may assign to location request 126 (FIG. 1) one or more LPs of the plurality of LPs 130 (FIG. 1), based on APDM 146 (FIG. 1), the accuracy requirement of location request 126 (FIG. 1), and the power consumption requirement of location request 126 (FIG. 1), e.g., as described above.

As indicated at block 508, assigning the one or more LPs of the plurality of LPs to the location request may include determining a required power-accuracy combination of the plurality of power-accuracy combinations, based on the accuracy requirement and the power-consumption requirement. For example, controller 144 (FIG. 1) may determine power-accuracy combination 234 (FIG. 2), based the accuracy requirement of location request 126 (FIG. 1), and the power consumption requirement of location request 126 (FIG. 1), e.g., as described above.

As indicated at block 510, assigning one or more LPs of the plurality of LPs to the location request may include assigning to the location request one or more potential LPs defined by the APDM for the required power-accuracy combination. For example, controller 144 (FIG. 1) may assign one or more potential LPs of power-accuracy combination 234 (FIG. 2), e.g., as described above.

As indicated at block 512, the method may include receiving a report from an LP of the one or more LPs. For example, controller 144 (FIG. 1) may receive report 135 (FIG. 1) from cellular LP 134 (FIG. 1), e.g., as described above.

As indicated at block 514, the method may include updating a state array corresponding to the location request based on the report, the state array including a plurality of states corresponding to the plurality of LPs, respectively. For example, controller 144 (FIG. 1) may update state array 156 (FIG. 1) corresponding to location request 126 (FIG. 1) based on report 135 (FIG. 1), e.g., as described above.

As indicated at block 516, updating the state array may include updating a state of the LP in the state array, based on the report. For example, controller 144 (FIG. 1) may update the state of cellular LP 134 (FIG. 1) in state array 156 (FIG. 1), based on report 135 (FIG. 1), e.g., as described above.

As indicated at block 518, updating the state array may include updating a state of the LP in another state array corresponding to another location request, based on the report. For example, controller 144 (FIG. 1) may update the state of cellular LP 134 (FIG. 1) in state array 158 (FIG. 1), based on report 135 (FIG. 1), e.g., as described above.

As indicated at block 520, the method may include sending a response to the location client, based on the state array. For example, controller 144 (FIG. 1) may send the response to location client 122 (FIG. 1), based on state array 156 (FIG. 1), e.g., as described above.

Figure 6:
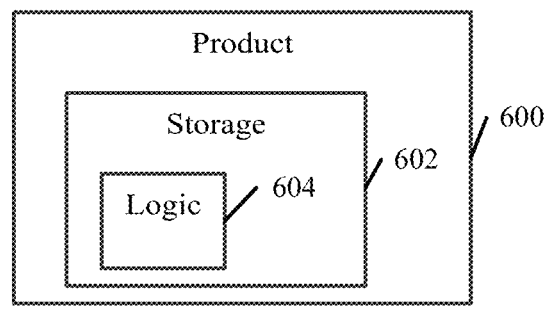
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), LP selector 140 (FIG. 1), controller 144 (FIG. 1), and/or to perform one or more operations of the methods of FIGS. 3, 4 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a location provider (LP) selector to operate in a mobile device, the location provider selector comprising a memory to store an Accuracy-Power Decision Matrix (APDM), the APDM to provide an allocation of a plurality of LPs according to a plurality of power consumption levels and a plurality of accuracy ranges; and a controller to receive from a location client of the mobile device a location request for a location fix of the mobile device, and to assign to the location request one or more LPs of the plurality of LPs, based on the APDM, an accuracy requirement of the location request, and a power consumption requirement of the location request.

Example 2 includes the subject matter of Example 1, and optionally, wherein the APDM includes a plurality of power-accuracy combinations, each power-accuracy combination being a combination of a power consumption level and an accuracy range, the APDM defining for each power-accuracy combination a plurality of potential LPs of the plurality of LPs.

Example 3 includes the subject matter of Example 2, and optionally, wherein the controller is to determine a required power-accuracy combination of the plurality of power-accuracy combinations based on the accuracy requirement and the power-consumption requirement, and to assign to the location request one or more potential LPs defined by the APDM for the required power-accuracy combination.

Example 4 includes the subject matter of Example 3, and optionally, wherein the controller is to assign to the location request all potential LPs defined by the APDM for the required power-accuracy combination.

Example 5 includes the subject matter of Example 3, and optionally, wherein the controller is to assign to the location request a selected LP of the plurality of potential LPs defined by the APDM for the required power-accuracy combination.

Example 6 includes the subject matter of any one of Examples 1-5, and optionally, wherein the controller is to receive a report from an LP of the one or more LPs, and to update a state array corresponding to the location request based on the report, the state array including a plurality of states corresponding to the plurality of LPs, respectively.

Example 7 includes the subject matter of Example 6, and optionally, wherein each state of the plurality of states includes a state selected from the group consisting of an assigned state, an unavailable state, an active state, an invalid state, and an unassigned state.

Example 8 includes the subject matter of Example 6 or 7, and optionally, wherein the controller is to update a state of the LP in the state array, based on the report.

Example 9 includes the subject matter of any one of Examples 6-8, and optionally, wherein the controller is to update a state of an other LP in the state array, based on the report.

Example 10 includes the subject matter of any one of Examples 6-9, and optionally, wherein the controller is to update a state of the LP in another state array corresponding to another location request, based on the report.

Example 11 includes the subject matter of any one of Examples 6-10, and optionally, wherein the controller it to send a response to the location client based on the state array.

Example 12 includes the subject matter of any one of Examples 1-11, and optionally, wherein the plurality of location providers comprises one or more location providers selected from the group consisting of a global navigation satellite system (GNSS) location provider, a cellular location provider, a time of flight (ToF) location provider, and a receive signal strength indication (RSSI) location provider.

Example 13 includes a mobile device comprising a radio; a memory; a processor; a plurality of location providers (LPs); and an LP selector to store an Accuracy-Power Decision Matrix (APDM), the APDM to provide an allocation of a plurality of LPs according to a plurality of power consumption levels and a plurality of accuracy ranges, the LP selector to receive from a location client of the mobile device a location request for a location fix of the mobile device, and to assign to the location request one or more LPs of the plurality of LPs, based on the APDM, an accuracy requirement of the location request, and a power consumption requirement of the location request. The mobile device may include one or more other elements, for example, one or more antennas.

Example 14 includes the subject matter of Example 13, and optionally, wherein the APDM includes a plurality of power-accuracy combinations, each power-accuracy combination being a combination of a power consumption level and an accuracy range, the APDM defining for each power-accuracy combination a plurality of potential LPs of the plurality of LPs.

Example 15 includes the subject matter of Example 14, and optionally, wherein the LP selector is to determine a required power-accuracy combination of the plurality of power-accuracy combinations based on the accuracy requirement and the power-consumption requirement, and to assign to the location request one or more potential LPs defined by the APDM for the required power-accuracy combination.

Example 16 includes the subject matter of Example 15, and optionally, wherein the LP selector is to assign to the location request all potential LPs defined by the APDM for the required power-accuracy combination.

Example 17 includes the subject matter of Example 15, and optionally, wherein the LP selector is to assign to the location request a selected LP of the plurality of potential LPs defined by the APDM for the required power-accuracy combination.

Example 18 includes the subject matter of any one of Examples 13-17, and optionally, wherein the LP selector is to receive a report from an LP of the one or more LPs, and to update a state array corresponding to the location request based on the report, the state array including a plurality of states corresponding to the plurality of LPs, respectively.

Example 19 includes the subject matter of Example 18, and optionally, wherein each state of the plurality of states includes a state selected from the group consisting of an assigned state, an unavailable state, an active state, an invalid state, and an unassigned state.

Example 20 includes the subject matter of Example 18 or 19, and optionally, wherein the LP selector is to update a state of the LP in the state array, based on the report.

Example 21 includes the subject matter of any one of Examples 18-20, and optionally, wherein the LP selector is to update a state of an other LP in the state array, based on the report.

Example 22 includes the subject matter of any one of Examples 18-21, and optionally, wherein the LP selector is to update a state of the LP in another state array corresponding to another location request, based on the report.

Example 23 includes the subject matter of any one of Examples 18-22, and optionally, wherein the LP selector it to send a response to the location client based on the state array.

Example 24 includes the subject matter of any one of Examples 13-23, and optionally, wherein the plurality of location providers comprises one or more location providers selected from the group consisting of a global navigation satellite system (GNSS) location provider, a cellular location provider, a time of flight (ToF) location provider, and a receive signal strength indication (RSSI) location provider.

Example 25 includes a method performed by a mobile device, the method comprising storing an Accuracy-Power Decision Matrix (APDM), the APDM to provide an allocation of a plurality of LPs according to a plurality of power consumption levels and a plurality of accuracy ranges; receiving from a location client of the mobile device a location request for a location fix of the mobile device; and assigning to the location request one or more LPs of the plurality of LPs, based on the APDM, an accuracy requirement of the location request, and a power consumption requirement of the location request.

Example 26 includes the subject matter of Example 25, and optionally, wherein the APDM includes a plurality of power-accuracy combinations, each power-accuracy combination being a combination of a power consumption level and an accuracy range, the APDM defining for each power-accuracy combination a plurality of potential LPs of the plurality of LPs.

Example 27 includes the subject matter of Example 26, and optionally, comprising determining a required power-accuracy combination of the plurality of power-accuracy combinations based on the accuracy requirement and the power-consumption requirement, and assigning to the location request one or more potential LPs defined by the APDM for the required power-accuracy combination.

Example 28 includes the subject matter of Example 27, and optionally, comprising assigning to the location request all potential LPs defined by the APDM for the required power-accuracy combination.

Example 29 includes the subject matter of Example 27, and optionally, comprising assigning to the location request a selected LP of the plurality of potential LPs defined by the APDM for the required power-accuracy combination.

Example 30 includes the subject matter of any one of Examples 25-29, and optionally, comprising receiving a report from an LP of the one or more LPs, and updating a state array corresponding to the location request based on the report, the state array including a plurality of states corresponding to the plurality of LPs, respectively.

Example 31 includes the subject matter of Example 30, and optionally, wherein each state of the plurality of states includes a state selected from the group consisting of an assigned state, an unavailable state, an active state, an invalid state, and an unassigned state.

Example 32 includes the subject matter of Example 30 or 31, and optionally, comprising updating a state of the LP in the state array, based on the report.

Example 33 includes the subject matter of any one of Examples 30-32, and optionally, comprising updating a state of an other LP in the state array, based on the report.

Example 34 includes the subject matter of any one of Examples 30-33, and optionally, comprising updating a state of the LP in another state array corresponding to another location request, based on the report.

Example 35 includes the subject matter of any one of Examples 30-34, and optionally, comprising sending a response to the location client based on the state array.

Example 36 includes the subject matter of any one of Examples 25-35, and optionally, wherein the plurality of location providers comprises one or more location providers selected from the group consisting of a global navigation satellite system (GNSS) location provider, a cellular location provider, a time of flight (ToF) location provider, and a receive signal strength indication (RSSI) location provider.

Example 37 includes a product including one or more tangible computer-readable non-transitory storage media comprising computer-executable instructions operable to, when executed by at least one computer processor, enable the at least one computer processor to implement a method at a mobile device, the method comprising storing an Accuracy-Power Decision Matrix (APDM), the APDM to provide an allocation of a plurality of LPs according to a plurality of power consumption levels and a plurality of accuracy ranges; receiving from a location client of the mobile device a location request for a location fix of the mobile device; and assigning to the location request one or more LPs of the plurality of LPs, based on the APDM, an accuracy requirement of the location request, and a power consumption requirement of the location request.

Example 38 includes the subject matter of Example 37, and optionally, wherein the APDM includes a plurality of power-accuracy combinations, each power-accuracy combination being a combination of a power consumption level and an accuracy range, the APDM defining for each power-accuracy combination a plurality of potential LPs of the plurality of LPs.

Example 39 includes the subject matter of Example 38, and optionally, wherein the method comprises determining a required power-accuracy combination of the plurality of power-accuracy combinations based on the accuracy requirement and the power-consumption requirement, and assigning to the location request one or more potential LPs defined by the APDM for the required power-accuracy combination.

Example 40 includes the subject matter of Example 40, and optionally, wherein the method comprises assigning to the location request all potential LPs defined by the APDM for the required power-accuracy combination.

Example 41 includes the subject matter of Example 40, and optionally, wherein the method comprises assigning to the location request a selected LP of the plurality of potential LPs defined by the APDM for the required power-accuracy combination.

Example 42 includes the subject matter of any one of Examples 37-41, and optionally, wherein the method comprises receiving a report from an LP of the one or more LPs, and updating a state array corresponding to the location request based on the report, the state array including a plurality of states corresponding to the plurality of LPs, respectively.

Example 43 includes the subject matter of Example 42, and optionally, wherein each state of the plurality of states includes a state selected from the group consisting of an assigned state, an unavailable state, an active state, an invalid state, and an unassigned state.

Example 44 includes the subject matter of Example 42 or 43, and optionally, wherein the method comprises updating a state of the LP in the state array, based on the report.

Example 45 includes the subject matter of any one of Examples 42-44, and optionally, wherein the method comprises updating a state of an other LP in the state array, based on the report.

Example 46 includes the subject matter of any one of Examples 42-45, and optionally, wherein the method comprises updating a state of the LP in another state array corresponding to another location request, based on the report.

Example 47 includes the subject matter of any one of Examples 42-46, and optionally, wherein the method comprises sending a response to the location client based on the state array.

Example 48 includes the subject matter of any one of Examples 37-47, and optionally, wherein the plurality of location providers comprises one or more location providers selected from the group consisting of a global navigation satellite system (GNSS) location provider, a cellular location provider, a time of flight (ToF) location provider, and a receive signal strength indication (RSSI) location provider.

Example 49 includes an apparatus comprising means for storing at a mobile device an Accuracy-Power Decision Matrix (APDM), the APDM to provide an allocation of a plurality of LPs according to a plurality of power consumption levels and a plurality of accuracy ranges; means for receiving from a location client of the mobile device a location request for a location fix of the mobile device; and means for assigning to the location request one or more LPs of the plurality of LPs, based on the APDM, an accuracy requirement of the location request, and a power consumption requirement of the location request.

Example 50 includes the subject matter of Example 49, and optionally, wherein the APDM includes a plurality of power-accuracy combinations, each power-accuracy combination being a combination of a power consumption level and an accuracy range, the APDM defining for each power-accuracy combination a plurality of potential LPs of the plurality of LPs.

Example 51 includes the subject matter of Example 50, and optionally, comprising means for determining a required power-accuracy combination of the plurality of power-accuracy combinations based on the accuracy requirement and the power-consumption requirement, and assigning to the location request one or more potential LPs defined by the APDM for the required power-accuracy combination.

Example 52 includes the subject matter of Example 51, and optionally, comprising means for assigning to the location request all potential LPs defined by the APDM for the required power-accuracy combination.

Example 53 includes the subject matter of Example 51, and optionally, comprising means for assigning to the location request a selected LP of the plurality of potential LPs defined by the APDM for the required power-accuracy combination.

Example 54 includes the subject matter of any one of Examples 49-53, and optionally, comprising means for receiving a report from an LP of the one or more LPs, and updating a state array corresponding to the location request based on the report, the state array including a plurality of states corresponding to the plurality of LPs, respectively.

Example 55 includes the subject matter of Example 54, and optionally, wherein each state of the plurality of states includes a state selected from the group consisting of an assigned state, an unavailable state, an active state, an invalid state, and an unassigned state.

Example 56 includes the subject matter of Example 54 or 55, and optionally, comprising means for updating a state of the LP in the state array, based on the report.

Example 57 includes the subject matter of any one of Examples 54-56, and optionally, comprising means for updating a state of an other LP in the state array, based on the report.

Example 58 includes the subject matter of any one of Examples 54-57, and optionally, comprising means for updating a state of the LP in another state array corresponding to another location request, based on the report.

Example 59 includes the subject matter of any one of Examples 54-58, and optionally, comprising means for sending a response to the location client based on the state array.

Example 60 includes the subject matter of any one of Examples 49-59, and optionally, wherein the plurality of location providers comprises one or more location providers selected from the group consisting of a global navigation satellite system (GNSS) location provider, a cellular location provider, a time of flight (ToF) location provider, and a receive signal strength indication (RSSI) location provider.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A location provider (LP) selector to operate in a mobile device, the location provider selector comprising:
   a memory to store an Accuracy-Power Decision Matrix (APDM), the APDM to provide an allocation of a plurality of LPs according to a plurality of power consumption levels and a plurality of accuracy ranges; and
   a controller to receive from a location client of said mobile device a location request for a location fix of said mobile device, and to assign to said location request one or more LPs of said plurality of LPs, based on said APDM, an accuracy requirement of said location request, and a power consumption requirement of said location request.

2. The LP selector of claim 1, wherein said APDM includes a plurality of power-accuracy combinations, each power-accuracy combination being a combination of a power consumption level and an accuracy range, said APDM defining for each power-accuracy combination a plurality of potential LPs of said plurality of LPs.

3. The LP selector of claim 2, wherein said controller is to determine a required power-accuracy combination of the plurality of power-accuracy combinations based on the accuracy requirement and the power-consumption requirement, and to assign to said location request one or more potential LPs defined by the APDM for the required power-accuracy combination.

4. The LP selector of claim 3, wherein said controller is to assign to said location request all potential LPs defined by the APDM for the required power-accuracy combination.

5. The LP selector of claim 3, wherein said controller is to assign to said location request a selected LP of the plurality of potential LPs defined by the APDM for the required power-accuracy combination.

6. The LP selector of claim 1, wherein said controller is to receive a report from an LP of said one or more LPs, and to update a state array corresponding to said location request based on said report, said state array including a plurality of states corresponding to said plurality of LPs, respectively.

7. The LP selector of claim 6, wherein each state of said plurality of states includes a state selected from the group consisting of an assigned state, an unavailable state, an active state, an invalid state, and an unassigned state.

8. The LP selector of claim 6, wherein, based on said report, said controller is to update in said state array a state of at least one LP selected from the group consisting of said LP and another LP.

9. The LP selector of claim 6, wherein said controller is to update a state of said LP in another state array corresponding to another location request, based on said report.

10. The LP selector of claim 6, wherein said controller it to send a response to said location client based on said state array.

11. The LP selector of claim 1, wherein said plurality of location providers comprises one or more location providers selected from the group consisting of a global navigation satellite system (GNSS) location provider, a cellular location provider, a time of flight (ToF) location provider, and a receive signal strength indication (RSSI) location provider.

12. A mobile device comprising:
   a radio;
   a memory;
   a processor;
   a plurality of location providers (LPs); and
   an LP selector to store an Accuracy-Power Decision Matrix (APDM), the APDM to provide an allocation of a plurality of LPs according to a plurality of power consumption levels and a plurality of accuracy ranges, said LP selector to receive from a location client of said mobile device a location request for a location fix of said mobile device, and to assign to said location request one or more LPs of said plurality of LPs, based on said APDM, an accuracy requirement of said location request, and a power consumption requirement of said location request.

13. The mobile device of claim 12, wherein said APDM includes a plurality of power-accuracy combinations, each power-accuracy combination being a combination of a power consumption level and an accuracy range, said APDM defining for each power-accuracy combination a plurality of potential LPs of said plurality of LPs.

14. The mobile device of claim 13, wherein said LP selector is to determine a required power-accuracy combination of the plurality of power-accuracy combinations based on the accuracy requirement and the power-consumption requirement, and to assign to said location request one or more potential LPs defined by the APDM for the required power-accuracy combination.

15. The mobile device of claim 12, wherein said LP selector is to receive a report from an LP of said one or more LPs, and to update a state array corresponding to said location request based on said report, said state array including a plurality of states corresponding to said plurality of LPs, respectively.

16. The mobile device of claim 15, wherein, based on said report, said LP selector is to update in said state array a state of at least one LP selected from the group consisting of said LP and another LP.

17. The mobile device of claim 12 comprising at least one antenna.

18. A method performed by a mobile device, the method comprising:
   storing an Accuracy-Power Decision Matrix (APDM), the APDM to provide an allocation of a plurality of Location Providers (LPs) according to a plurality of power consumption levels and a plurality of accuracy ranges;
   receiving from a location client of said mobile device a location request for a location fix of said mobile device; and assigning to said location request one or more LPs of said plurality of LPs, based on said APDM, an accuracy requirement of said location request, and a power consumption requirement of said location request.

19. The method of claim 18, wherein said APDM includes a plurality of power-accuracy combinations, each power-accuracy combination being a combination of a power consumption level and an accuracy range, said APDM defining for each power-accuracy combination a plurality of potential LPs of said plurality of LPs.

20. The method of claim 18 comprising receiving a report from an LP of said one or more LPs, and updating a state array corresponding to said location request based on said report, said state array including a plurality of states corresponding to said plurality of LPs, respectively.

21. A product including one or more tangible computer-readable non-transitory storage media comprising computer-executable instructions operable to, when executed by at least one computer processor, enable the at least one computer processor to implement a method at a mobile device, the method comprising:

storing an Accuracy-Power Decision Matrix (APDM), the APDM to provide an allocation of a plurality of Location providers (LPs) according to a plurality of power consumption levels and a plurality of accuracy ranges;

receiving from a location client of said mobile device a location request for a location fix of said mobile device; and assigning to said location request one or more LPs of said plurality of LPs, based on said APDM, an accuracy requirement of said location request, and a power consumption requirement of said location request.

22. The product of claim 21, wherein said APDM includes a plurality of power-accuracy combinations, each power-accuracy combination being a combination of a power consumption level and an accuracy range, said APDM defining for each power-accuracy combination a plurality of potential LPs of said plurality of LPs.

23. The product of claim 22, wherein said method comprises determining a required power-accuracy combination of the plurality of power-accuracy combinations based on the accuracy requirement and the power-consumption requirement, and assigning to said location request one or more potential LPs defined by the APDM for the required power-accuracy combination.

24. The product of claim 21, wherein said method comprises receiving a report from an LP of said one or more LPs, and updating a state array corresponding to said location request based on said report, said state array including a plurality of states corresponding to said plurality of LPs, respectively.

* * * * *